US011604697B2

(12) United States Patent
Jarvis

(10) Patent No.: US 11,604,697 B2
(45) Date of Patent: Mar. 14, 2023

(54) DISTRIBUTED ERASURE ENCODING IN SHARED FILE SYSTEM

(71) Applicant: Quantum Corporation, San Jose, CA (US)

(72) Inventor: Ben Jarvis, Mendota Heights, MN (US)

(73) Assignee: Quantum Corporation, San Jose, CA (US)

(*) Notice: Subject to any disclaimer, the term of this patent is extended or adjusted under 35 U.S.C. 154(b) by 495 days.

(21) Appl. No.: 16/830,516

(22) Filed: Mar. 26, 2020

(65) Prior Publication Data

US 2021/0303399 A1    Sep. 30, 2021

(51) Int. Cl.
| | |
|---|---|
| *G06F 11/00* | (2006.01) |
| *G06F 11/10* | (2006.01) |
| *G06F 16/22* | (2019.01) |
| *G06K 9/62* | (2022.01) |
| *G06F 11/20* | (2006.01) |

(52) U.S. Cl.
CPC ...... *G06F 11/1096* (2013.01); *G06F 11/1004* (2013.01); *G06F 11/2094* (2013.01); *G06F 16/2237* (2019.01); *G06K 9/6223* (2013.01); *G06F 2211/1057* (2013.01)

(58) Field of Classification Search
CPC ............. G06F 11/1096; G06F 11/1004; G06F 11/2094; G06F 16/2237; G06F 2211/1057; G06F 3/0619; G06F 3/065; G06F 3/067; G06F 11/1092; G06F 11/1088; G06K 9/6223
USPC .................................................. 714/770, 773
See application file for complete search history.

(56) References Cited

U.S. PATENT DOCUMENTS

| | | | |
|---|---|---|---|
| 7,734,643 B1 * | 6/2010 | Waterhouse | G06F 16/10 |
| | | | 711/111 |
| 10,528,429 B1 * | 1/2020 | Vempati | G06F 3/0631 |
| 11,068,363 B1 * | 7/2021 | Hayes | G06F 11/2094 |
| 11,249,901 B2 * | 2/2022 | Danilov | G06F 3/067 |
| 2013/0198756 A1 * | 8/2013 | Grube | G06F 3/064 |
| | | | 718/104 |
| 2016/0011936 A1 * | 1/2016 | Luby | G06F 3/067 |
| | | | 714/6.2 |
| 2016/0274973 A1 * | 9/2016 | Sundaram | G06F 11/1068 |
| 2016/0357440 A1 * | 12/2016 | Wang | G06F 3/0604 |

(Continued)

*Primary Examiner* — Albert Decady
*Assistant Examiner* — Osman M Alshack
(74) *Attorney, Agent, or Firm* — Roeder & Broder LLP; James P. Broder

(57) ABSTRACT

Systems, methods, and circuitries are provided for supporting distributed erasure coding in a shared file system. In one example, a method is provided to be performed by an initiator device configured to read and write data in files stored in a plurality of storage nodes that are controlled by a file management system. The method includes generating a stripe by identifying data to be stored in a storage system; dividing the data into K data segments; and performing an erasure encoding operation on the K data segments to generate a parity segment, wherein the stripe includes the K data segments and the parity segment. The method includes requesting, from the file management system, respective memory allocations in the storage devices for storing respective segments of the stripe; and transmitting, to each of the plurality of storage nodes, a respective instruction to store a respective data or parity segment in the memory allocation on the respective storage device.

21 Claims, 4 Drawing Sheets

(56) References Cited

U.S. PATENT DOCUMENTS

2017/0116074 A1* 4/2017 Hayes ................. G06F 11/1088
2020/0250031 A1* 8/2020 Li ....................... G06F 11/1068
2021/0096952 A1* 4/2021 Ali ...................... G06F 3/0689
2021/0133026 A1* 5/2021 Horn ................... G06F 11/1076

* cited by examiner

DISTRIBUTED ERASURE ENCODING IN SHARED FILE SYSTEM

BACKGROUND

Shared file systems include a set of storage devices managed by a central management system. Shared file systems that include and/or utilize disk array appliances as storage devices provide many benefits including scalability and redundancy/error coding for data durability.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
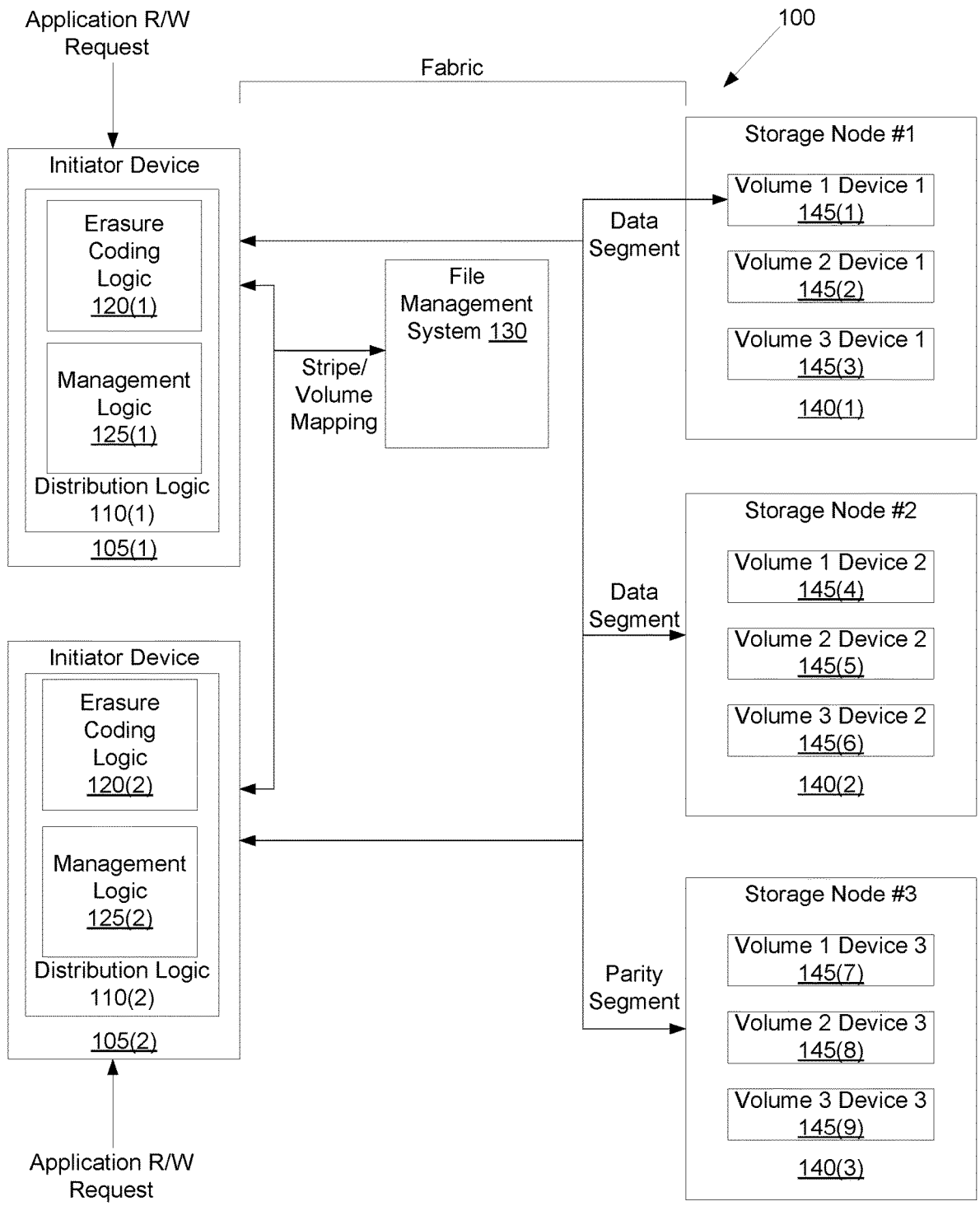
FIG. 1 illustrates an example shared file system that includes distributed erasure encoding in accordance with various aspects described.

In a shared file system, a large number of storage devices are aggregated together into one file system which is then used simultaneously by many users at many different computers. Historically, this aggregation has been done using traditional disk array appliances. In the broadest sense, disk array appliances are systems that allow a plurality of storage devices to be treated as a single unit of storage. Examples of storage devices that are used in disk array appliances include spinning hard disk drives (HDDs) and solid-state drives (SSDs). Some modern disk array appliances utilize a non-volatile memory express (NVMe) controller interface to provide high-speed transfer of data to SSDs over a high-speed Peripheral Component Interconnect Express (PCIe) bus. The storage devices in a disk array appliance may all be of the same type or may be of different types to support different usage cases for different data. The storage devices in a disk array appliance are controlled by one or more storage array controllers that can access the data stored across the multiple drives.

Disk array appliances may have built-in redundancy features that support data recovery in the event that one or more of the storage devices fails. Disk array appliances may generate and/or store erasure encoding data that can be used to reconstruct data stored on a failed drive. Examples of erasure encoding include XOR, P/Q parity, Reed-Solomon, and so on.

One example disk array appliance architecture is a redundant array of independent/inexpensive disks (RAID). In a RAID disk array appliance, data is distributed across multiple disks or drives to provide redundancy and/or improved performance. There are multiple "levels" of RAID storage schemes. Higher level RAID storage arrays (e.g., level 5 or 6) provide for data recovery in the event of one (level 5) or two (level 6) drive failures. In these RAID levels, data is separated into blocks and different blocks are stored in different "stripes" of the drives. Erasure encoding data is generated for the data and also distributed across the drives.

An example disk array appliance includes a chassis containing two controller computers and asset of hard drives or SSDs. The appliance provides protection against failure of the storage devices using either mirroring (RAID 1 or RAID 10) or erasure encoding (RAID5 or RAID6). Protection against controller failure is provided by using dual-ported drives which can be operated from either controller. In normal operation, each controller operates half of the drives. In the event of a controller failure, the surviving controller provides access to all of the drives.

A shared file system is constructed by connecting one or more disk array appliances and one or more end-user workstations to a fabric, such as fiber channel or iSCSI, and consolidating all of the storage into a file system name space available to all of the users.

A pertinent complication of disk array appliances is the necessity of read-modify-write for erasure encoding. Erasure encoding is performed on blocks of data of some size, often called stripe segments. 128 KB is a popular stripe segment size. A disk array using 10 disks in an 8+2 RAID6 arrangement would write 128 KB to each of the 8 data bearing drives before moving on to the next, resulting in a full stripe of 8×128 KB=1 MB. The 2×128 KB of parity data is then generated from this 8×128 KB of user data. Erasure encoding schemes typically have the limitation that they cannot be incrementally or partially updated. Thus, in order to modify a given 1 MB stripe of data, the parity must be completely regenerated for that stripe. Therefore, if a disk array appliance receives a write request to alter 32 KB of data, it must first read the entire 1 MB stripe containing that 32 KB, modify the data, regenerate the erasure encoding, and then write the entire 1 MB stripe back to storage. This process is aptly named read-modify-write (RMW). Read-modify-write can cause major performance and efficiency issues. In the example just described, in order to perform a 32 KB write, it was necessary to read 1 MB and then write 1 MB serially, wasting a great deal of bandwidth and also incurring double latency for two round trips to storage.

To partially alleviate this performance degradation, disk array appliances typically contain a non-volatile RAM (NVRAM) write-back cache in each controller. The most important function of this cache is to buffer writes. In the previous example case, when a 32 KB write request (also sometimes referred to herein simply as a "write") is received, the write can be stored in the cache rather than immediately perform a read-modify-write. This means that if more writes come in later for other parts of the same 1 MB stripe, the writes can be consolidated and the cost of the RMW can be amortized over more data. Otherwise, if no other writes in the same stripe are received and it becomes necessary to flush the 32 KB from the cache with a read-modify-write after all, this can be done asynchronously in the background after acknowledging the write to the initiator, reducing the latency impact to perceived performance.

A complication with the write-back cache scheme is ensuring protection of the cache itself in the event of a controller failure. In the event that a controller fails, if the cache contained unwritten data, that data would not be available to the surviving controller. If the surviving controller then read the corresponding data location from the storage devices, it would return stale data. To avoid this issue, disk array appliances typically use cache mirroring.

That is to say whenever a controller writes data into its cache, it synchronously transmits the same data to the other controller, so that when both controllers are operational their caches are guaranteed to contain the same unwritten data. This in turn has the downside of increased overhead & latency, since all write operations must touch both controllers in the normal case where both controllers are functioning.

In summary, when both controllers are operational, a particular I/O write request is handled as follows. The initiator sends the request to the primary controller, which stores the write into NVRAM cache. That cache is synchronously flushed into the second controller's NVRAM cache, which otherwise does not participate in the I/O. Later, the NVRAM cache is flushed through the erasure encoding (EC) logic, possibly including RMW, and the resulting stripe segments are written to the individual storage devices. If controller 1 were offline at this point, controller 2 would perform these writes into controller 1's volume. Note that when both controllers are operational, controller 2 could be servicing I/O requests to volume 2 independent of controller 1 except for the need for NVRAM cache synchronization.

This disk array appliance architecture has some shortcomings that have become acute in recent years due to the availability of much higher performance NVMe storage. Consider the performance requirements of an example 16-drive disk array containing rotational hard drives versus equivalent capacity NVMe devices:

16× hard drive disk array:
 100 MB/s per drive=>1600 MB/s total
 5000-10000 microsecond seek time
16×NVMe disk array
 3500 MB/s per drive=>56000 MB/s total
 10-100 microsecond seek time In the example hard disk array case, the controller needs to be able to perform erasure encoding calculations at 1600 MB/s, the controller needs an NVRAM cache that can provide at least double that, 3200 MB/s, since the controller must write to the cache and later read from the cache to write to the disk. The controller needs to mirror its cache changes to the other controller at no more than 1600 MB/s. The controller has a latency budget of hundreds of microseconds to do all this, since the controller's latency can be hidden behind the much larger storage device latency.

In the example NVMe disk array case, the controller needs to be able to perform erasure encoding calculations at 56000 MB/s, the controller needs an NVRAM cache that provides at least 112000 MB/s of bandwidth, and the controller needs to mirror changes to the other controller at up to 56000 MB/s. The controller has a latency budget of only single digit microseconds to do this or else the overhead of the controller will degrade overall performance of the shared file system.

In short, the performance specifications necessary for the controller computers have gone from something easily obtainable with a cheap system to something that is not realistically achievable even with the fastest and most expensive computers available. The performance of the storage has simply outgrown the architecture.

The disk array architecture is referred to as a shared-disk and, arguably, a shared-memory architecture, because two controller nodes share access to a common set of disks, and synchronously mirror their cache memory. This architecture is losing popularity due to the high overhead previously described, as well as the fact that the hardware required is sold at premium prices relative to the commodity hardware that is more commonly used in ordinary computers. NVMe drives that support being connected to two host PCIe bus at the same time are two or three times as expensive as equivalent drives without that capability. NVRAM is similarly expensive compared to volatile DRAM found in ordinary computers.

Some modern shared file systems utilize an architecture that features a distributed shared-nothing cluster of computers and storage devices. The term "shared-nothing" is used to indicate that the computers in the cluster are built from ordinary commodity hardware, with no shared storage devices, no shared caches or non-volatile memory, and no proprietary means of communicating with each other, and so on.

Shared-nothing clusters may be used in database and object store applications, and, in a more limited way, file system storage. Described herein is a distribute erasure encoding architecture that provides a shared-nothing cluster which has equivalent protection capabilities to a traditional disk array, without the performance limitations.

For the purposes of this description, an NVMe based RAID storage array system is sometimes used to provide context for various features. However, it is to be understood that the distributed erasure encoding techniques described herein may be used to improve the performance of any storage system in which a collection of storage devices are connected and managed as a single storage device. Some aspects of the described distributed erasure encoding techniques may have particular applicability to shared file systems that include storage devices that do not depend on mechanical motion (e.g., persistent memory devices, SSDs, and so on). However the distributed erasure encoding techniques may also be employed with "spinning" drives (e.g., HDDs).

FIG. 1 illustrates an exemplary shared file system 100 that includes multiple initiator devices 105 (two are shown, many more may be included), a file management system 130, and multiple storage nodes 140 (three are shown, many more may be included). In one example, each storage node is a computer that includes a central processing unit (CPU), volatile memory, a set of storage devices 145 (three per node are shown, many more may be included per node) and a fabric connection. Each storage device is organized into sectors. I/O requests to each storage device include a first sector address at which to start and a number of sectors to read/write. When multiple storage devices are combined into an erasure encoded volume, some number of the storage devices are chosen to store data, some number of the storage devices are chosen to store parity data, and a stripe segment size is also selected. In one example, the stripe segment size is chosen to be equal to the device sector size, because that is the smallest possible size.

Since each storage device 145 is contained in one storage node 140 with no access to any other storage node 140, a failure or simply a loss of communication with a storage node 140 results in a loss of communication with all of the storage devices 145 contained in that node. To protect against this, the initiator devices 105 include distribution logic 110. The distribution logic 110 includes erasure coding logic 120 that performs erasure encoding for the purpose of reconstructing data that is unavailable due to storage nodes that have failed or are otherwise unavailable. The distribution logic 110 also includes management logic 125 that interacts with the file management system 130 and storage nodes 140 to read and write data in the shared file system.

The erasure coding logic 120 performs erasure encoding at the initiator device 105, before the I/O request is sent over the fabric. The management logic 125 interacts with the file management system 130 to determine volume/block memory allocations (write)/locations (read) for stripe segments and issues I/O requests to the individual storage devices 145 on a per stripe segment basis. Therefore, the I/O requests being issued over the fabric are the low-level stripe segments being sent, by the initiator device, to each individual storage device, rather than larger I/O requests to the combined erasure encoded volume (which would include devices in all three storage nodes). In this manner, the system 100 leverages existing functionality of the file management system 130 to effectively allocate storage amongst the storage nodes. Further, in this architecture the file management system 130 is also used to handle coherency issues pertaining to the data in the storage nodes.

The storage devices 145 that make up an erasure encoded volume (e.g., storage devices 145(1), 145(4), and 145(7) for volume 1) can be spread across the multiple storage nodes 140(1-3) such that each storage node contains only one storage device in any particular erasure encoded volume. As depicted, a 2+1 (RAID5) arrangement is used, but any K+M arrangement of nodes is possible. Given this spreading, the inability to access a storage node can be survived in the same way as the inability to access a specific device, by depending on the erasure encoding to regenerate the missing data.

Because the erasure encoding is performed in each of the initiator devices 105, the architecture of the storage nodes 145 becomes very simple. Each storage node simply makes its storage devices 145 available for I/O over the fabric. The storage node 140 may or may not provide write-back caching. If the storage node 140 does provide write-back caching there is no need to synchronize its cache externally, since no other controller has access to its storage devices 145.

A principle challenge that must be overcome in the shared file system 100 is that of read-modify-write. As the read-modify-write is performed prior to erasure encoding, and erasure encoding is now being performed in the initiator, read-modify-write should be performed at the initiator 105. There are three issues presented by performance of RMW by the initiator device.

First, any RMW bandwidth amplification that occurs impacts fabric performance and not just storage performance. Whereas before a 32 KB I/O resulted in 1 MB of read and 1 MB of write within the disk array controller, that 1 MB of read and 1 MB of write will now be transmitted over the fabric as well. This makes RMW all the more undesirable as the latency will be higher and the fabric bandwidth is precious.

Secondly, the above described NVRAM caching technique cannot be used to mitigate the RMW penalty because the storage devices are distributed over a cluster of different nodes. As the initiator device 105 is likely a workstation under the control of an individual user, the initiator device cannot safely cache unwritten data. If the initiator device 105 were to fail, that data would be lost and unavailable to other initiator devices. If the cache was synchronized over the network, the same performance problem the controllers have would result, only worse since now the cache synchronization will be done over many initiator devices rather than just two controllers.

Third, RMW cannot, in general, be performed safely in a multiple-writer shared file system environment, due to the potential for a race condition. Consider two initiator devices 105(1) and 105(2) that each want to modify 32 KB portions of the same 1 MB stripe. The following could occur:
Initiator device 105(1) reads the 1 MB stripe.
Initiator device 105(2) reads the 1 MB stripe.
Initiator device 105(1) modifies the stripe by replacing its 32 KB portion of interest.
Initiator device 105(2) modifies the stripe by replacing its 32 KB portion of interest.
Initiator device 105(1) recomputes EC and writes the modified stripe.
Initiator device 105(2) recomputes EC and writes the modified stripe.

At the end of this process, initiator 105(1)'s modification has been silently lost, replaced by initiator 105(2)'s write of the full stripe. Naively, one can avoid this by using some form of distributed lock management scheme where an initiator device must obtain a global lock in order to perform a RMW, such a scheme would likely not perform well in an environment where hundreds of gigabytes of throughput and potentially hundreds of millions of I/O operations per second occur across a cluster. Another approach is to rely on the file management system to prevent this potential for a race condition. In one example, the potential race condition is overcome by using an extremely small stripe size, for example, a stripe segment size that matches a file system block size. While a traditional disk array might use a stripe segment of 128 KB, in one example, the shared file system 100 uses a stripe segment as small as 512 bytes.

The traditionally larger stripe segments were used for two reasons. First, because erasure encoding was historically too expensive to compute on a CPU, an ASIC hardware RAID controller would be used. The latency cost of transferring data to the hardware RAID controller and getting the response back was high, so that latency needed to be amortized over a large amount of data. Today, with AVX2 and AVX512 extensions available on modern CPUs, performing the erasure encoding on an ordinary CPU is entirely acceptable. In this case, no high latency transfer of data is required, so tiny stripe segments become viable to compute at high performance.

Secondly, a tiny stripe size was traditionally avoided because it potentially reduces the number of read operations per second that can be performed using spinning disks. For instance, in an 8+2 RAID6 with a 128 KB stripe size, random 4 KB reads can be performed independently on each of the 8 data bearing volumes provided parity is not being checked. This allows 8 rotational hard drives to move their disk heads independently servicing different I/O requests, improving read I/O operations per second by up to 8x. Today, with the focus on flash storage devices with no seek time and comparatively massive I/O per second performance, this concern is not nearly as motivating.

By using a tiny erasure encoding stripe size, the stripe size can be matched to the block size used by the file management system 130 above the volume. This has some important implications for use with a shared file system. Regardless the type of storage devices 145 being used, a shared file system has an obligation to ensure safe, coherent access to files by multiple file system initiator devices. One way of doing this is a token arbitration. When a given file system initiator device wishes to use a given file, the initiator device requests a read token or a write token from the file management system, depending on whether it is opening the file for read or read/write. Only one initiator device is allowed to hold a write token for a given file at a time, but many initiator devices may hold read tokens. This ensures that while multiple initiator devices can operate on the file system simultaneously, only one initiator device may write any given file at a time. All files are allocated in units of file system blocks, and no two files share a file system block.

The most typical file system block size is 4 KB, but larger sizes are possible. Therefore, every non-empty file will be allocated in units of 4 KB.

By matching the full stripe size to the file system block size, the file management system 130 will ensure that the previously described read-modify-write race will not occur. If an initiator device is writing a stripe, that stripe is equal to or entirely contained inside some file system block. In order for the initiator device to be writing that block, the file management system 130 requires the initiator device to hold a token that ensures there is no other initiator device which might race it. Therefore, multiple initiator devices 105 can be allowed to RMW the storage devices 145 without any need for additional coherency locking beyond that which the shared file management system 130 is already providing.

Additionally, by matching the stripe size to the file system block size, the probability of requiring RMW in the first place is greatly reduced. Files will start on a stripe boundary, and no files will share the same stripe. Therefore, the typical case where one reads files from beginning to end into a large buffer will not require RMW. Additionally, operating systems typically provide a performance benefit if applications perform their I/O in a page-aligned manner, where a page is typically 4 KB. Therefore, if the stripe size is also 4 KB, any application taking advantage of page-aligned I/O pattern will also not require RMW. Finally, if an application is performing unaligned I/O and does require RMW, the amount of bandwidth required for that RMW is reduced compared to the more traditional larger stripe size. No I/O will require RMW of more than two stripes one at the beginning of the I/O and one at the end. If a stripe is very small, then the amount of RMW bandwidth required is accordingly very small.

Finally, the impact of RMW can be reduced by doing an intelligent form of read ahead and caching. Given that an initiator device must have a write token to be modifying stripes, data can be read ahead and cached safely provided the data being cached is within a file for which the initiator device holds the token on, and that the cache is dropped when the token is released. Therefore, if an application is performing I/O that is sequential but unaligned to FSB, each stripe that is at the end of each I/O can be saved in anticipation of using it again for the start of the next I/O. The stripes that are expected to be included in a later RMW can be read ahead if it is assumed that sequential I/O of the same size will continue throughout the file.

An additional challenge is dealing with the integrity of an erasure encoded volume when its member nodes may be sporadically unavailable over time. A traditional disk array has its storage devices connected to each controller, and it is assumed that the bus connecting them never fails. A mechanism must be employed to ensure that split-brain cannot occur, which is to say both controllers online but thinking the other is offline and trying to operate the volume at the same time. Beyond that, no coordination is necessary. The pair of controllers have a shared notion of which storage devices are available and which are not, and explicitly manage them accordingly. The erasure encoding data is normally not inspected on reads, since it is assumed that unless the storage devices are marked as failed, they will return correct data. The erasure encoding is normally used only to regenerate the data on a failed device after it has been recognized as failed and replaced.

In the described shared nothing distributed scheme, different initiator devices may have different connectivity to the storage nodes. One initiator device might be able to access all the storage nodes while another initiator device can only access a portion of them. If a storage node is offline and writes are performed, then that storage node will contain stale data that is out of sync with the other storage nodes. When an offline storage node returns to the cluster, it will not know what happened while it was offline. It should be ensured that at some time the system is unable to regenerate the correct data because too many storage nodes are out of sync with each other.

As will be described in more detail below, the management logic 125 accomplishes this by using an uncoordinated quorum model. In the illustrated trivial 3 node 2+1 cluster, at least two of the three storage devices in a volume must be available and in sync with each other in order for I/O to be successful. A third device can be unavailable and ignored, or stale and repaired using the other two devices.

Figure 2:
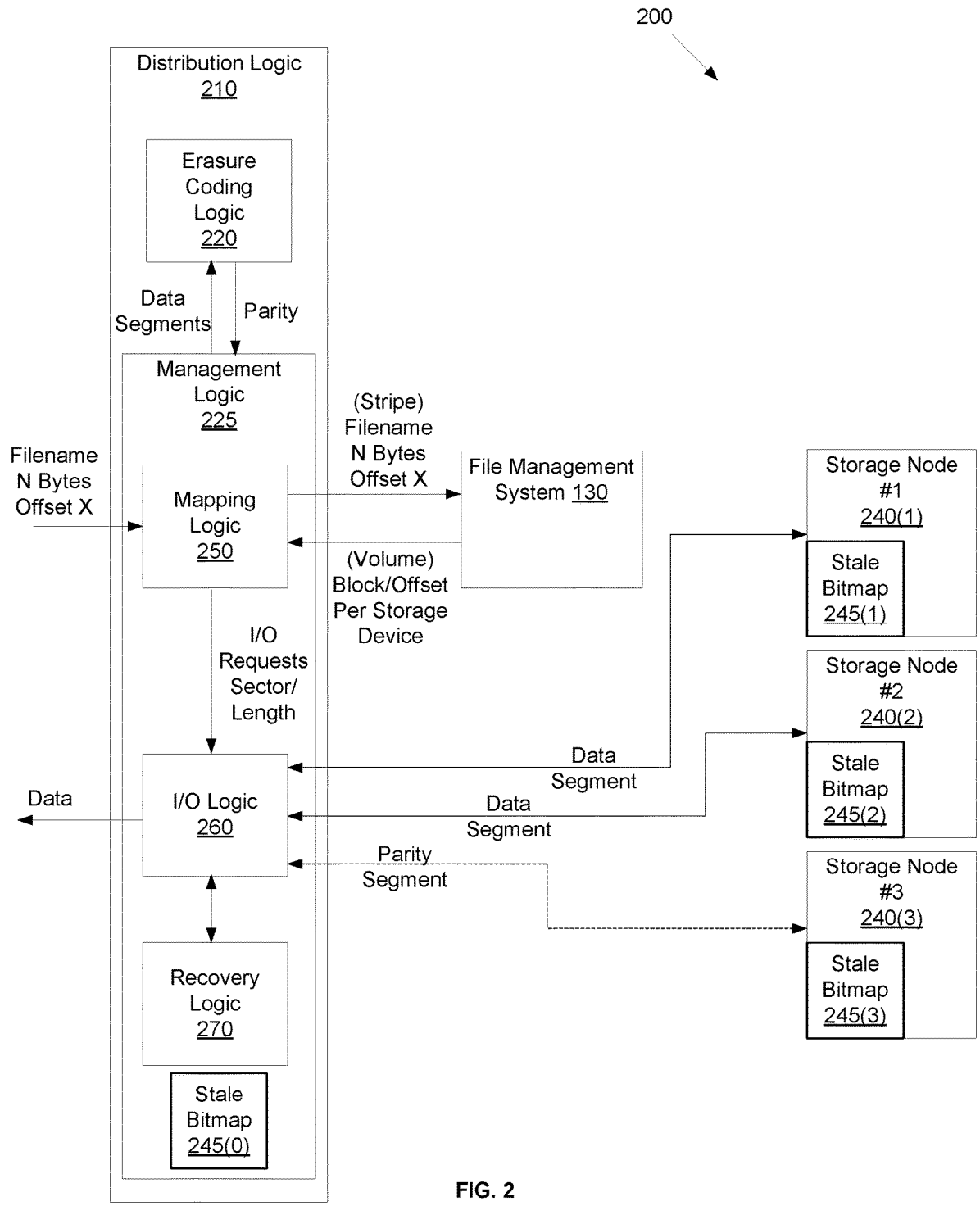
FIG. 2 illustrates an example distribution logic interacting with a shared file system to provide distributed erasure encoding in accordance with various aspects described.

FIG. 2 illustrates an example shared file system 200 with distributed erasure coding in which an initiator device (not shown) includes distribution logic 210 with erasure coding logic 220 and management logic 225. The management logic 225 sends data segments to the erasure coding logic 220 to generate one or more parity segments and to perform other erasure coding operations as described below. The management logic 225 includes mapping logic 250, I/O logic 260, and recovery logic 270. The mapping logic 250 interacts with the file management system 130 to map stripes specified by filename, N bytes, and offset byte X to a set of "volume relative block offsets" basis I/O requests, one I/O request for each storage device (not shown see FIG. 1). In this manner, the file management system 130 can issue/manage a token for any blocks that are involved in a write operation to avoid a race condition.

The mapping logic 250 converts the volume relative block offsets into sector offset and length and provides the converted individual I/O requests to the I/O logic 260. The I/O logic 260 issues the read/write requests, one per stripe segment, to the individual storage devices in storage nodes 240. While in FIG. 2, the parity segment is illustrated as being stored in storage node #3, in some examples, the parity segment is stored in different nodes, with data segments being stored in storage node #3. In one example, the node storing the parity segment is selected according to some predetermined or dynamic rotation scheme.

Figure 3:
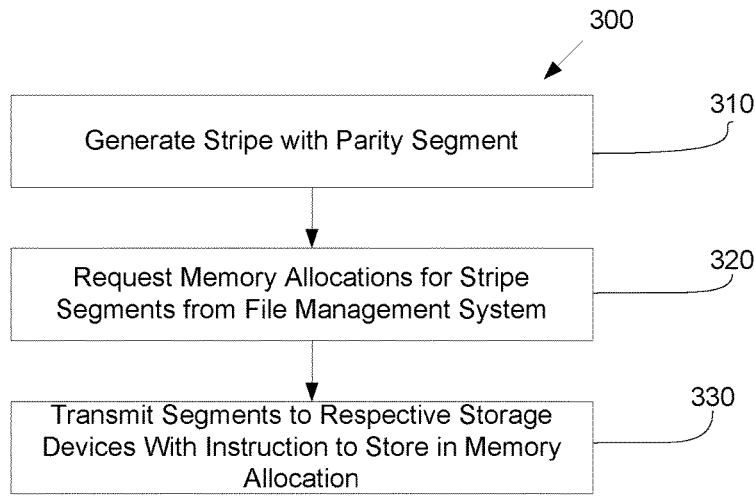
FIG. 3 illustrates an example method of performing distributed erasure encoding in a shared file system in accordance with various aspects described.
Figure 4:
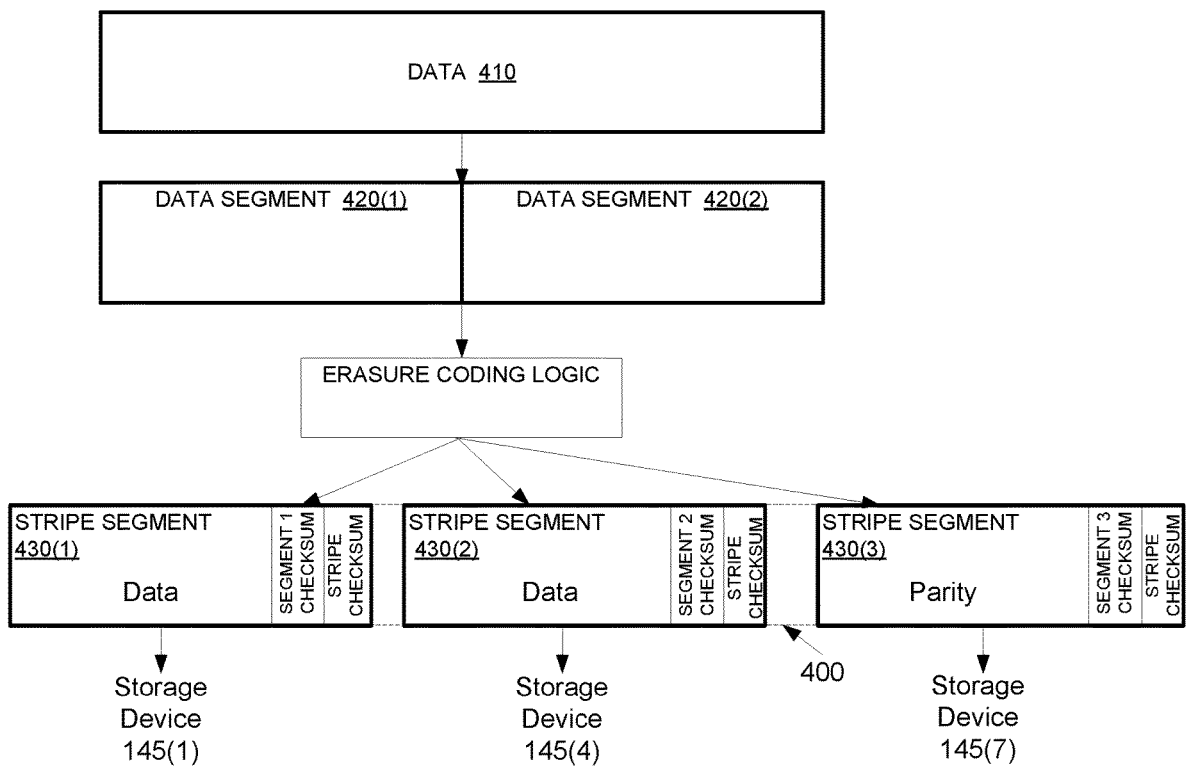
FIG. 4 illustrates an example stripe generated that facilitates distributed erasure encoding in accordance with various aspects described.

FIG. 3 outlines an example method 300 that may be performed by distribution logic 110, 210 of FIGS. 1 and 2, respectively to perform a write of a stripe. The method includes, at 310, generating a stripe. Referring to FIG. 4, in one example, the stripe is generated by identifying data 410 to be stored in a storage system; dividing the data into a plurality of data segments 420 (also sometimes referred to with an unknown variable "K" or "K data segments 420"); and performing an erasure encoding operation on the plurality of, or K data segments to generate a parity segment. Thus, the stripe includes the K data segments 430(1), 430(2) and the parity segment 430(3). Returning to FIG. 3, the method includes, at 320, requesting, from the file management system, respective memory allocations in the storage devices for storing respective segments of the stripe and, at 330, transmitting, to each of the plurality of storage nodes, a respective instruction to store a respective data or parity segment in the memory allocation on the respective storage device.

Returning to FIG. 2, when the I/O logic 260 performs reads against the example three-node cluster, the I/O logic 260 must get two successful responses and must know that those two responses are correct and in sync with each other. Provided this is known, the third potentially missing segment can be recovered by recovery logic 270 using the returned segments and the same erasure encoding technique used by erasure coding logic 220. Therefore, the I/O logic 260 may start by optimistically requesting the stripe segments from only two of the devices (possibly the two devices that contain data segments as shown). If the I/O logic gets successful responses from both, the third segment can be recovered using recovery logic 260 without having ever requested it over the fabric. In this manner the network bandwidth usage is equal to logical throughput, avoiding the overhead of reading parity over the fabric. If the I/O logic 260 fails to get two successful responses, then the I/O logic requests the third segment. If the I/O logic is unable to get two successful responses even when requesting from all three devices, then the I/O logic can block and retry indefinitely, assuming that storage nodes will come back later, or ultimately give up and return an error.

When the I/O logic 260 performs writes against the three storage nodes, the I/O logic must attempt to write to all three nodes and should get a successful acknowledgement from at least two before considering the I/O write to be successful. If the I/O logic does not get at least two acknowledgements, the I/O logic can block and retry until the write ultimately succeeds, or again give up and return an error. It is pertinent to note that a torn write scenario is possible. That is to say, the I/O logic could write only one device successfully. In that situation the I/O logic has not written enough data to recover the desired new write, but one of the segments for the data that was already there has been destroyed. If the other two members are still in sync with each other, the old data can still be recovered via parity, but if they are out of sync, it is lost. The three-node cluster has the property that the I/O logic either succeeds in writing 2 or 3 of 3 and make the new data recoverable, or only succeeds in writing 0 or 1 of 3, in which case the old data is recoverable. Provided, again, that the original stripe was in sync.

The illustrated 2+1 storage node cluster provides only minimal data protection. It provides protection from only one node loss or one storage device loss at a time. If one storage node is temporarily offline for maintenance, and simultaneously a storage device in another storage node fails, data could be lost.

Therefore, in practice, clusters larger than 2+1 would likely be employed. One might have an 8+2 or an 8+3 or 32+3. In each case, the total number of failures that can be tolerated is nominally equal to the number of parity devices, minus some edge cases related to stale data. For that reason, in a distributed erasure encoding scheme, one might want to provide for more parity devices than one might in a disk array architecture. E.g., where one rarely does more than RAID6 (n+2) in traditional disk arrays, n+3 or n+4 is likely more appropriate in this architecture since the erasure encoding is used to protect against node outages for maintenance, not just the comparatively much less common device failures.

To enable the illustrated distributed erasure coding and shared-nothing storage nodes, two additional mechanisms are employed. First, the I/O logic 260 is provided with a way to know if the data returned by a storage device is in sync with the other members of the volume, or if it is stale data left behind by a previous write while the node in question was offline. Secondly, the I/O logic is provided with a way of repairing stale data on devices as rapidly as possible when they return online, and a means of ensuring that such stale data does not accumulate to the point where it results in data loss.

The first concern is challenging because the storage node does not know whether or not the data it has is stale or not. That must be determined in the I/O logic 260. There are two ways to achieve this. Firstly, if there are enough parity devices, parity can be used to verify correctness even in the absence of multiple device segments. For instance, if an 8+3 volume is in use, and the I/O logic gets only 10 of the 11 expected responses, the I/O logic can still use the two parity responses to check the 8 data bearing devices. If the parity checks out, the I/O logic knows that the devices are in sync. If the parity does not check out, the two parity devices can be used to repair up to one stale response. As such, this naïve approach allows a K+M erasure encoded volume to survive up to M−1 stale members. Therefore, a +1 (RAID5) volume cannot survive any stale members, and a +2 (RAID6) can survive one stale member, and so on. Thus, one additional good parity member is needed to detect staleness.

FIG. 4 illustrates a technique called stripe descriptors. In this scheme, when the erasure coding logic 220 computes erasure encoding on data 410 (that is separated into segments 420) to generate a stripe 400 that includes stripe segments 430, the erasure coding logic also computes a checksum on the full stripe (stripe checksum), and a checksum on each individual stripe segment 430 (segment checksum). When the stripe segments are written by the I/O logic 260 to their corresponding storage devices, the stripe checksum and the stripe segment checksum for that segment is included. Thus, instead of writing a 512 byte segment to each device, The I/O logic may write 512+8 bytes, the extra 8 bytes being a 4-byte stripe checksum and a 4-byte stripe segment checksum.

Figure 5:
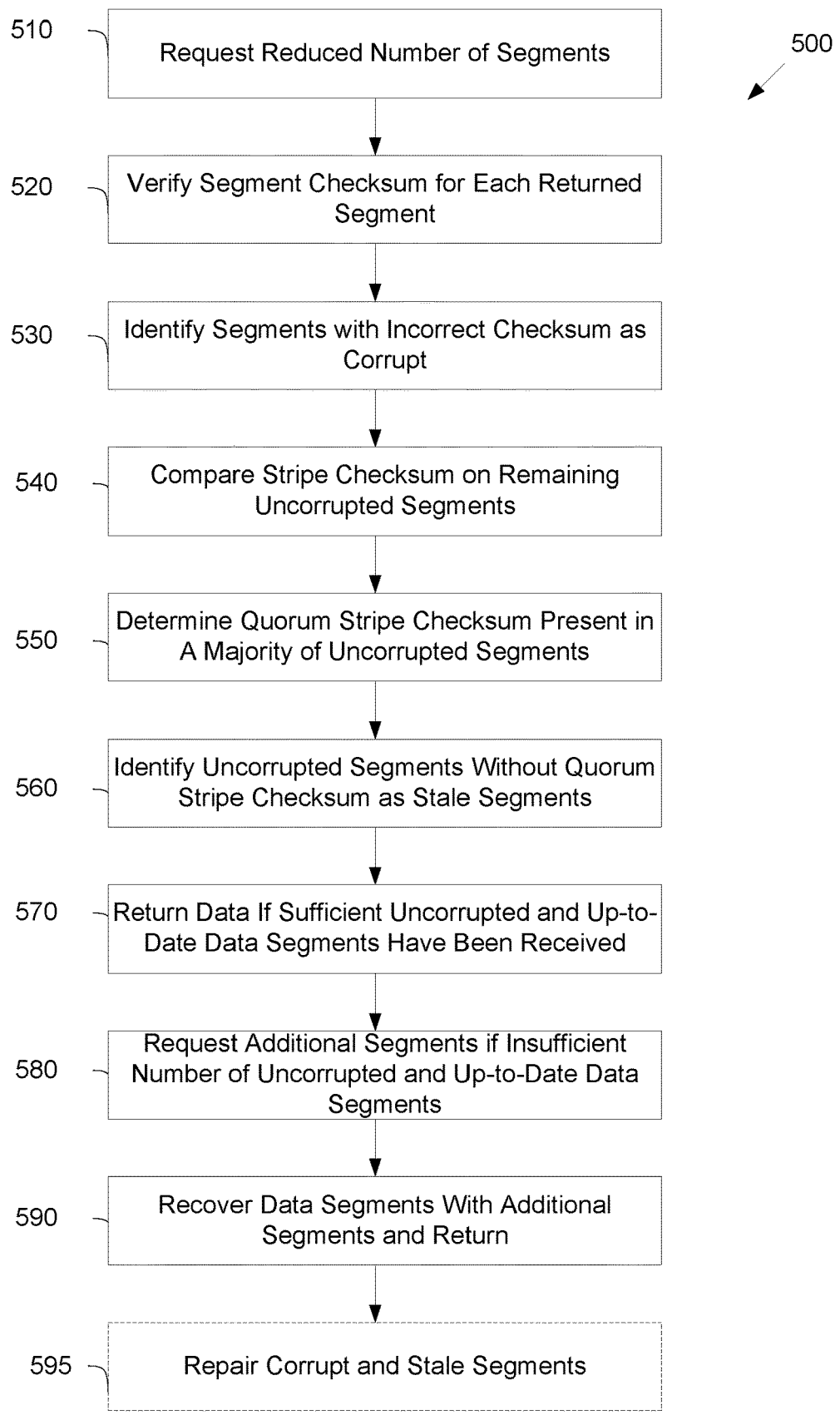
FIG. 5 illustrates an example method for reading data from a shared file system that includes distributed erasure encoding in accordance with various aspects described.

FIG. 5 illustrates an example method 500 that may be performed by I/O logic 260 of FIG. 2 when performing a read operation. At 510, a reduced number of stripe segments is requested from a corresponding reduced number of storage devices (e.g., a sufficient number to determine all data without using parity). The stripe descriptors are read along with the received stripe segments, and, as will be seen, the stripe descriptors are used to determine staleness independently of the erasure encoding. At 520, each segment checksum is verified against each returned stripe segment. At 530, each stripe segment in which the segment checksum is incorrect is identified as corrupt. At 540, the stripe checksum in each segment's stripe descriptor is compared to the stripe checksum on the remaining uncorrupted segments. At 550 whatever stripe checksum appears in the majority of uncorrupted segments' stripe descriptors is identified as the quorum stripe checksum, and at 560 any segments which do not include the quorum stripe checksum are identified as stale. This allows for the identification of stale segments directly. Therefore, with stripe descriptors present, a K+M erasure encoded volume can survive up to M stale members, rather than M−1 as before. Essentially the parity device requirement is decreased by one for equivalent level of protection.

At 570 if a sufficient number of uncorrupted segments has been received, the data is returned. At 580, additional segments are requested if an insufficient number of uncorrupted and up-to-date segments have been received. At 590, data segments are recovered using the additional segments and returned. At 595, corrupt and stale segments are repaired using the other segments. This repair may be performed asynchronously as described below.

A mechanism for repairing stale stripe segments rapidly and ensuring they do not accumulate should be employed. Naively, one way to approach this is simply by scrubbing the volume, which is to say reading the whole volume from start to finish. The act of reading the volume will identify and repair any stale repairable segments. It may take a significant amount of time to read the entire volume, however, especially if the scrubbing speed is throttled to a small percentage of available throughput so as to avoid impacting the performance of real clients. Thus it may be better to memorialize the existence of stale segments as they occur and perform a more targeted scrubbing of only the areas that need it.

To this end, a "stale bitmap" (245 in FIG. 2) is maintained for each volume, with, in one example, each bit in the bitmap representing 1 GB of the volume, which of course is many individual stripes. Storage nodes and initiator devices in the cluster maintain a copy of the bitmap for the volume in memory. Whenever an initiator device tries to write a stripe and is not able to successfully write all members, it updates its stale bitmap to indicate that the corresponding 1 GB chunk is now potentially stale. If this bit was not already set, the initiator device broadcasts an event to all the other initiator devices and storage nodes, who in turn update their bitmaps. Further, when an initiator device detects a corrupted segment or stripe, the initiator device updates its stale bitmap.

Periodically, initiator devices can request an updated bitmap from each the other initiator devices and storage nodes to combine with their own by simple bitwise OR. When a storage node returns online, it OR's its bitmap with the others. This bitmap can then be used to rapidly scrub only those areas which the bitmap indicates are potentially stale, and then flip those bits back to zero. Since the bitmap only tracks staleness at a granularity of 1 GB, it isn't very large. A 1 petabyte volume would require only 128 KB of bitmap. This mechanism is used in an advisory capacity only, meaning that it is not required that the initiator devices and storage nodes synchronously transmit these staleness notifications to other initiator devices and storage nodes, and in the event of a sudden power outage of the entire cluster, all nodes might go offline at once and the bitmap could be lost. In that unlikely situation, a full scrub of the volume must be performed when the cluster returns online. This scrub can be done at full bandwidth, in which case it will nominally complete in mere minutes with NVMe devices.

It can be seen from the foregoing description that by performing distributed erasure encoding on initiator devices, rather than a disk array appliance, a shared-nothing cluster can offer better economics and performance with modern NVMe storage.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for implementing a storage array according to embodiments and examples described herein.

Example 1 is a method, including, with an initiator device configured to read and write data in files stored in a plurality of storage nodes that are controlled by a file management system: generating a stripe by: identifying data to be stored in the storage nodes; dividing the data into a plurality of, or K data segments; and performing an erasure encoding operation on the K data segments to generate a parity segment, wherein the stripe includes the K data segments and the parity segment. The method includes: requesting, from the file management system, respective memory allocations in storage devices of the storage nodes for storing respective segments of the stripe; and transmitting, to each of the plurality of storage nodes, a respective instruction to store a respective data or parity segment in the memory allocation on a respective storage device.

Example 2 includes the subject matter of example 1, including or omitting optional elements, wherein a size of the stripe is selected to be equal to a block size used by the file management system.

Example 3 includes the subject matter of example 1, including or omitting optional elements, further including receiving respective acknowledgements from each of a subset of the plurality of storage nodes (also sometimes referred to with an unknown variable "n" or "n storage nodes" indicating that a segment of the stripe was successfully stored in a respective storage node; and determining whether the acknowledged number of segments of the stripe that were successfully stored in a respective storage node, or "n", is a sufficient number of segments to recover the data; and in response to determining that n is not a sufficient number of segments, determining that the data was not successfully stored in the plurality of storage nodes.

Example 4 includes the subject matter of example 3, including or omitting optional elements, further including identifying a storage node that failed to acknowledge that the segment was successfully stored; and updating a bitmap associated with the storage node to indicate that segment in the storage node is stale.

Example 5 includes the subject matter of example 1, including or omitting optional elements, further including performing a stripe checksum operation on bit values in the stripe and recording a stripe checksum result in each of the data segments and the parity segment.

Example 6 includes the subject matter of example 5, including or omitting optional elements, further including: issuing a read request to the file management system for a second stripe of data; receiving a plurality of storage device memory locations that store segments in the second stripe from the file management system; requesting, from respective storage devices, respective segments stored at the received storage device memory locations; receiving a plurality of segments; determining a number (sometimes referred to with an unknown variable "m") of segments having matching stripe checksum results; determining whether the number of segments of the second stripe having matching stripe checksum results, or "m", is a sufficient number of segments to recover data in the second stripe; and in response to determining that m is not a sufficient number of segments, determining that the second stripe of data has not been successfully read.

Example 7 includes the subject matter of example 6, including or omitting optional elements, further including, in response to determining that m is a sufficient number of segments, recovering data stored on segments not received using the m segments.

Example 8 includes the subject matter of example 1, including or omitting optional elements, further including performing a respective segment checksum operation on bit values in each of the plurality of, or K data segments and the parity segment; and recording a respective segment checksum result in each of the respective plurality of, or K data segments and the parity segment.

Example 9 includes the subject matter of example 8, including or omitting optional elements, further including: issuing a read request to the file management system for a second stripe of data; receiving a plurality of storage device memory locations that store segments in the second stripe from the file management system; requesting, from respective storage devices, respective segments stored at the received storage device memory locations; receiving a plurality of segments; validating the segment checksum result for each of the plurality of segments; determining a number (sometimes referred to with an unknown variable "p") of segments having correct segment checksum results; determining whether the number of segments of the second stripe having correct segment checksum results, or "p", is a sufficient number of segments to recover data in the second stripe; and in response to determining that p is not a sufficient number of segments, determining that the second stripe of data has not been successfully read.

Example 10 includes the subject matter of example 9, including or omitting optional elements, in response to determining that p is a sufficient number of segments, recovering data stored on segments having an incorrect segment checksum result.

Example 11 is a distribution logic for use with an initiator device configured to read and write data in files stored in a plurality of storage nodes that are controlled by a file management system, the distribution logic including management logic, erasure coding logic, mapping logic, and I/O logic. The management logic is configured to generate a stripe by identifying data to be stored in the storage nodes; and dividing the data into a plurality of, or K data segments. The erasure coding logic is configured to perform an erasure encoding operation on the plurality of, or K data segments to generate a parity segment, wherein the stripe includes the plurality of, or K data segments and the parity segment. The mapping logic configured to request, from the file management system, respective memory allocations in storage devices of the plurality of storage nodes for storing respective segments of the stripe. The I/O logic is configured to transmit, to each of the plurality of storage nodes, a respective instruction to store a respective data or parity segment in the memory allocation on the respective storage device.

Example 12 includes the subject matter of example 11, including or omitting optional elements, wherein a size of the stripe is selected to be equal to a block size used by the file management system.

Example 13 includes the subject matter of example 11, including or omitting optional elements, wherein the I/O logic is configured to: receive respective acknowledgements from each of a subset of the plurality of, or "n", storage nodes indicating that a segment was successfully stored in a respective storage node; and determine whether the acknowledged number of segments of the stripe that were successfully stored in a respective storage node, or "n" is a sufficient number of segments to recover the data; and in response to determining that n is not a sufficient number of segments, determine that the data was not successfully stored in the storage system.

Example 14 includes the subject matter of example 13, including or omitting optional elements, wherein the I/O logic is configured to: identify a storage node that failed to acknowledge that the segment was successfully stored; and update a bitmap associated with the storage node to indicate that segment in the storage node is stale.

Example 15 includes the subject matter of example 11, including or omitting optional elements, wherein the erasure coding logic is configured to perform a stripe checksum operation on bit values in the stripe and recording a stripe checksum result in each of the data segments and the parity segment.

Example 16 includes the subject matter of example 15, including or omitting optional elements, wherein the mapping logic is configured to: issue a read request to the file management system for a second stripe of data; and receive a plurality of storage device memory locations that store segments in the second stripe from the file management system. The I/O logic is configured to: request, from respective storage devices, respective segments stored at the received storage device memory locations; receive a plurality of segments; determine a number, or "m", of segments having matching stripe checksum results; determine whether the number of segments of the second stripe having matching stripe checksum results, or "m", is a sufficient number of segments to recover data in the second stripe; and in response to determining that m is not a sufficient number of segments, determine that the second stripe of data has not been successfully read.

Example 17 includes the subject matter of example 16, including or omitting optional elements, wherein the I/O logic is configured to, in response to determining that m is a sufficient number of segments, recover data stored on segments not received using the m segments.

Example 18 includes the subject matter of example 11, including or omitting optional elements, wherein the erasure coding logic is configured to: perform a respective segment checksum operation on bit values in each of a plurality of, or K data segments and the parity segment; and record a respective segment checksum result in each of the respective plurality of, or K data segments and the parity segment.

Example 19 includes the subject matter of example 18, including or omitting optional elements, wherein the mapping logic is configured to issue a read request to the file management system for a second stripe of data; and receive a plurality of storage device memory locations that store segments in the second stripe from the file management system. The I/O logic is configured to request, from respective storage devices, respective segments stored at the received storage device memory locations; receive a plurality of segments; validate the segment checksum result for each of the plurality of segments; determine a number, or "p", of segments having correct segment checksum results; determine whether the number of segments of the second stripe having correct segment checksum results, or "p" is a sufficient number of segments to recover data in the second stripe; and in response to determining that p is not a sufficient number of segments, determine that the second stripe of data has not been successfully read.

Example 20 includes the subject matter of example 19, including or omitting optional elements, wherein the I/O logic is configured to in response to determining that p is a sufficient number of segments, provide the p segments to recovery logic configured to recover data stored on segments having an incorrect segment checksum result.

Example 21 is an erasure coding logic for use with an initiator device, wherein the initiator device is configured to read and write data in files stored in a plurality of storage nodes that are controlled by a file management system. The erasure coding logic, is configured to: identify a plurality of, or K data segments; perform an erasure encoding operation on the plurality of, or K data segments to generate a parity segment, wherein a stripe includes the plurality of, or K data segments and the parity segment; and perform a stripe checksum operation on bit values in the stripe and recording a stripe checksum result in each of the data segments and the parity segment.

Example 22 includes the subject matter of example 20, including or omitting optional elements, wherein the erasure coding logic is configured to perform a respective segment checksum operation on bit values in each of the plurality of, or K data segments and the parity segment; and record a respective segment checksum result in each of the respective plurality of, or K data segments and the parity segment.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "logic," "module," "component," "system," "circuit," "circuitry," "element," "slice," and the like are intended to refer to a computer-related entity, hardware, software (e.g., in execution), and/or firmware. For example, logic or circuitry or a similar term can be a processor, a process running on a processor, a controller, an object, an executable program, a storage device, and/or a computer with a processing device. By way of illustration, an application running on a server and the server can also be a logic or circuitry. One or more logics or circuitries can reside within a process, and logic or circuitry can be localized on one computer and/or distributed between two or more computers. A set of elements or a set of other circuitry can be described herein, in which the term "set" can be interpreted as "one or more."

As another example, logic or circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, logic or circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "includes," "including," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. A method for performing distributed erasure encoding in a storage system that includes an initiator device configured to read and write data in files stored in a plurality of storage nodes that are controlled by a file management system, the method comprising:
   generating a stripe by:
     identifying data to be stored in the plurality of storage nodes;
     dividing the data into a plurality of data segments; and
     performing an erasure encoding operation on the plurality of data segments to generate a parity segment, wherein the stripe includes the plurality of data segments and the parity segment;

requesting, from the file management system, respective memory allocations in storage devices of the plurality of storage nodes for storing respective segments of the stripe;

transmitting, to each of the plurality of storage nodes, a respective instruction to store a respective data segment or parity segment in the memory allocation on a respective storage device;

receiving respective acknowledgements from each of a subset of the plurality of storage nodes indicating that a respective segment of the stripe was successfully stored in each of the subset of the plurality of storage nodes;

determining whether the acknowledged number of segments of the stripe that were successfully stored in a respective storage node is a sufficient number of segments of the stripe to recover the data; and in response to determining that the acknowledged number of segments of the stripe that were successfully stored in a respective storage node is not a sufficient number of segments of the stripe to recover the data, determining that the data was not successfully stored in the plurality of storage nodes.

2. The method of claim 1, wherein a size of the stripe is selected to be equal to a block size used by the file management system.

3. The method of claim 1, further comprising:
identifying a first storage node of the plurality of storage nodes that failed to acknowledge that the segment of the stripe was successfully stored; and
updating a bitmap associated with the first storage node to indicate that the segment of the stripe in the first storage node is stale.

4. The method of claim 1, further comprising:
performing a stripe checksum operation on bit values in the stripe and recording a stripe checksum result in each of the plurality of data segments and the parity segment.

5. A method for performing distributed erasure encoding in a storage system that includes an initiator device configured to read and write data in files stored in a plurality of storage nodes that are controlled by a file management system, the method comprising:
generating a stripe by:
identifying data to be stored in the plurality of storage nodes;
dividing the data into a plurality of data segments; and
performing an erasure encoding operation on the plurality of data segments to generate a parity segment, wherein the stripe includes the plurality of data segments and the parity segment;
requesting, from the file management system, respective memory allocations in storage devices of the plurality of storage nodes for storing respective segments of the stripe;
transmitting, to each of the plurality of storage nodes, a respective instruction to store a respective data segment or parity segment in the memory allocation on a respective storage device;
performing a stripe checksum operation on bit values in the stripe and recording a stripe checksum result in each of the plurality of data segments and the parity segment;
issuing a read request to the file management system for a second stripe of data;

receiving a plurality of storage device memory locations that store segments of the second stripe from the file management system;
requesting, from respective storage devices, respective segments of the second stripe stored at the received storage device memory locations;
receiving a plurality of segments of the second stripe;
determining a number of segments of the second stripe having matching stripe checksum results;
determining whether the number of segments of the second stripe having matching stripe checksum results is a sufficient number of segments of the second stripe to recover data in the second stripe; and
in response to determining that the number of segments of the second stripe having matching stripe checksum results is not a sufficient number of segments of the second stripe to recover data in the second stripe, determining that the second stripe of data has not been successfully read.

6. The method of claim 5, further comprising, in response to determining that the number of segments of the second stripe having matching stripe checksum results is a sufficient number of segments of the second stripe to recover data in the second stripe:
recovering data stored on segments of the second stripe not received using the segments of the second stripe having matching stripe checksum results.

7. The method of claim 1, further comprising:
performing a respective segment checksum operation on bit values in each of the plurality of data segments and the parity segment; and
recording a respective segment checksum result in each of the respective plurality of data segments and the parity segment.

8. The method of claim 7, further comprising:
issuing a read request to the file management system for a second stripe of data;
receiving a plurality of storage device memory locations that store segments of the second stripe from the file management system;
requesting, from respective storage devices, respective segments of the second stripe stored at the received storage device memory locations;
receiving a plurality of segments of the second stripe;
validating the segment checksum result for each of the plurality of segments of the second stripe;
determining a number of segments of the second stripe having correct segment checksum results;
determining whether the number of segments of the second stripe having correct segment checksum results is a sufficient number of segments of the second stripe to recover data in the second stripe; and
in response to determining that the number of segments of the second stripe having correct segment checksum results is not a sufficient number of segments of the second stripe to recover data in the second stripe, determining that the second stripe of data has not been successfully read.

9. The method of claim 8, further comprising:
in response to determining that the number of segments of the second stripe having correct segment checksum results is a sufficient number of segments of the second stripe to recover data in the second stripe, recovering data stored on segments of the second stripe having an incorrect segment checksum result.

10. A distribution logic for performing distributed erasure encoding in a storage system that includes an initiator device configured to read and write data in files stored in a plurality of storage nodes that are controlled by a file management system, the distribution logic comprising:

management logic configured to generate a stripe by:
identifying data to be stored in the plurality of storage nodes; and
dividing the data into a plurality of data segments;
erasure coding logic configured to perform an erasure encoding operation on the plurality of data segments to generate a parity segment,
wherein the stripe includes the plurality of data segments and the parity segment;
mapping logic configured to request, from the file management system, respective memory allocations in storage devices of the plurality of storage nodes for storing respective segments of the stripe; and
I/O logic configured to (i) transmit, to each of the plurality of storage nodes, a respective instruction to store a respective data segment or parity segment in the memory allocation on a respective storage device; (ii) receive respective acknowledgements from each of a subset of the plurality of storage nodes indicating that a respective segment of the stripe was successfully stored in; (iii) determine whether the acknowledged number of segments of the stripe that were successfully stored in a respective storage node is a sufficient number of segments of the stripe to recover the data; and (iv) in response to determining that the acknowledged number of segments of the stripe that were successfully stored in a respective storage node is not a sufficient number of segments of the stripe to recover the data, determine that the data was not successfully stored in the plurality of storage nodes.

11. The distribution logic of claim 10, wherein a size of the stripe is selected to be equal to a block size used by the file management system.

12. The distribution logic of claim 10, wherein the I/O logic is further configured to:
identify a first storage node of the plurality of storage nodes that failed to acknowledge that the segment of the stripe was successfully stored; and
update a bitmap associated with the first storage node to indicate that the segment of the stripe in the first storage node is stale.

13. The distribution logic of claim 10, wherein the erasure coding logic is further configured to:
perform a stripe checksum operation on bit values in the stripe and recording a stripe checksum result in each of the plurality of data segments and the parity segment.

14. The distribution logic of claim 13, wherein:
the mapping logic is further configured to:
issue a read request to the file management system for a second stripe of data; and
receive a plurality of storage device memory locations that store segments of the second stripe from the file management system; and
the I/O logic is further configured to:
request, from respective storage devices, respective segments of the second stripe stored at the received storage device memory locations;
receive a plurality of segments of the second stripe;
determine a number of segments of the second stripe having matching stripe checksum results;
determine whether the number of segments of the second stripe having matching stripe checksum results is a sufficient number of segments of the second stripe to recover data in the second stripe; and
in response to determining that the number of segments of the second stripe having matching stripe checksum results is not a sufficient number of segments of the second stripe to recover data in the second stripe, determine that the second stripe of data has not been successfully read.

15. The distribution logic of claim 14, wherein the I/O logic is further configured to, in response to determining that the number of segments of the second stripe having matching stripe checksum results is a sufficient number of segments of the second stripe to recover data in the second stripe:
recover data stored on segments of the second stripe not received using the segments of the second stripe having matching stripe checksum results.

16. The distribution logic of claim 10, wherein the erasure coding logic is further configured to:
perform a respective segment checksum operation on bit values in each of the plurality of data segments and the parity segment; and
record a respective segment checksum result in each of the respective plurality of data segments and the parity segment.

17. The distribution logic of claim 16, wherein:
the mapping logic is further configured to:
issue a read request to the file management system for a second stripe of data; and
receive a plurality of storage device memory locations that store segments of the second stripe from the file management system; and
the I/O logic is further configured to:
request, from respective storage devices, respective segments of the second stripe stored at the received storage device memory locations;
receive a plurality of segments of the second stripe;
validate the segment checksum result for each of the plurality of segments of the second stripe;
determine a number of segments of the second stripe having correct segment checksum results;
determine whether the number of segments of the second stripe having correct segment checksum results is a sufficient number of segments of the second stripe to recover data in the second stripe; and
in response to determining that the number of segments of the second stripe having correct segment checksum results is not a sufficient number of segments of the second stripe to recover data in the second stripe, determine that the second stripe of data has not been successfully read.

18. The distribution logic of claim 17, wherein the I/O logic is further configured to:
in response to determining that the number of segments of the second stripe having correct segment checksum results is a sufficient number of segments of the second stripe to recover data in the second stripe, provide the p segments to recovery logic that is further configured to recover data stored on segments of the second stripe having an incorrect segment checksum result.

19. An distribution logic for performing distributed erasure encoding in a storage system that includes an initiator device configured to read and write data in files stored in a plurality of storage nodes that are controlled by a file management system, the distribution logic comprising:
erasure coding logic being configured to:
identify a plurality of data segments of data stored in the plurality of storage nodes;

perform an erasure encoding operation on the plurality of data segments to generate a parity segment, wherein a stripe includes the plurality of data segments and the parity segment; and perform a stripe checksum operation on bit values in the stripe and recording a stripe checksum result in each of the plurality of data segments and the parity segment;

mapping logic that is configured to:
issue a read request to the file management system for a second stripe of data; and
receive a plurality of storage device memory locations that store segments of the second stripe from the file management system; and I/O logic that is configured to:
request, from respective storage devices, respective segments of the second stripe stored at the received storage device memory locations;
receive a plurality of segments of the second stripe;
determine a number of segments of the second stripe having matching stripe checksum results;
determine whether the number of segments of the second stripe having matching stripe checksum results is a sufficient number of segments of the second stripe to recover data in the second stripe; and
in response to determining that the number of segments of the second stripe having matching stripe checksum results is not a sufficient number of segments of the second stripe to recover data in the second stripe, determine that the second stripe of data has not been successfully read.

20. The distribution logic of claim 19 wherein the erasure coding logic is further configured to:
perform a respective segment checksum operation on bit values in each of the plurality of data segments and the parity segment; and
record a respective segment checksum result in each of the respective plurality of data segments and the parity segment.

21. The distribution logic of claim 20 wherein the I/O logic is further configured to:
validate the segment checksum result for each of the plurality of segments of the second stripe;
determine a number of segments of the second stripe having correct segment checksum results;
determine whether the number of segments of the second stripe having correct segment checksum results is a sufficient number of segments of the second stripe to recover data in the second stripe; and
in response to determining that the number of segments of the second stripe having correct segment checksum results is not a sufficient number of segments of the second stripe to recover data in the second stripe, determine that the second stripe of data has not been successfully read.

\* \* \* \* \*